H. I. CHEW & W. S. SERGEANT.
RESILIENT WHEEL.
APPLICATION FILED AUG. 4, 1914.
1,169,924.
Patented Feb. 1, 1916.
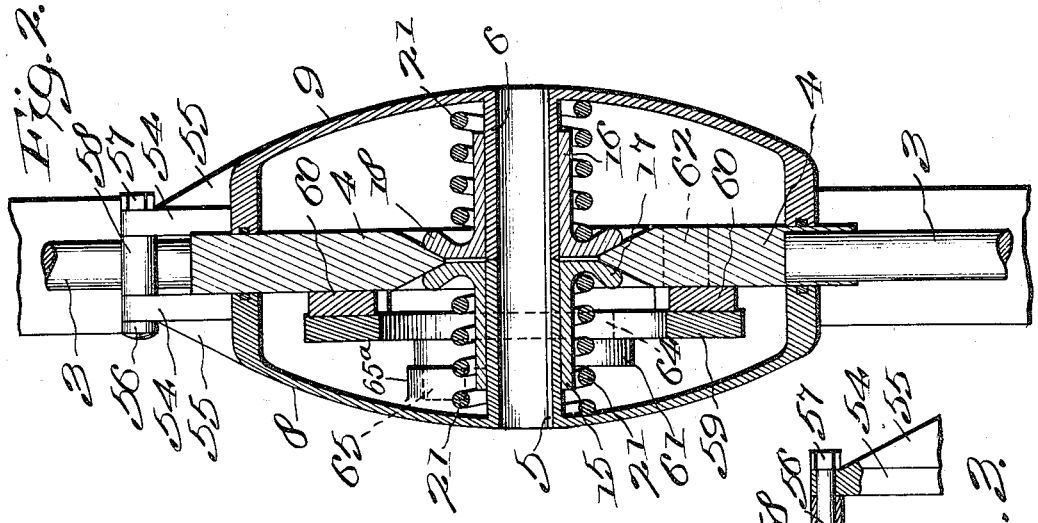
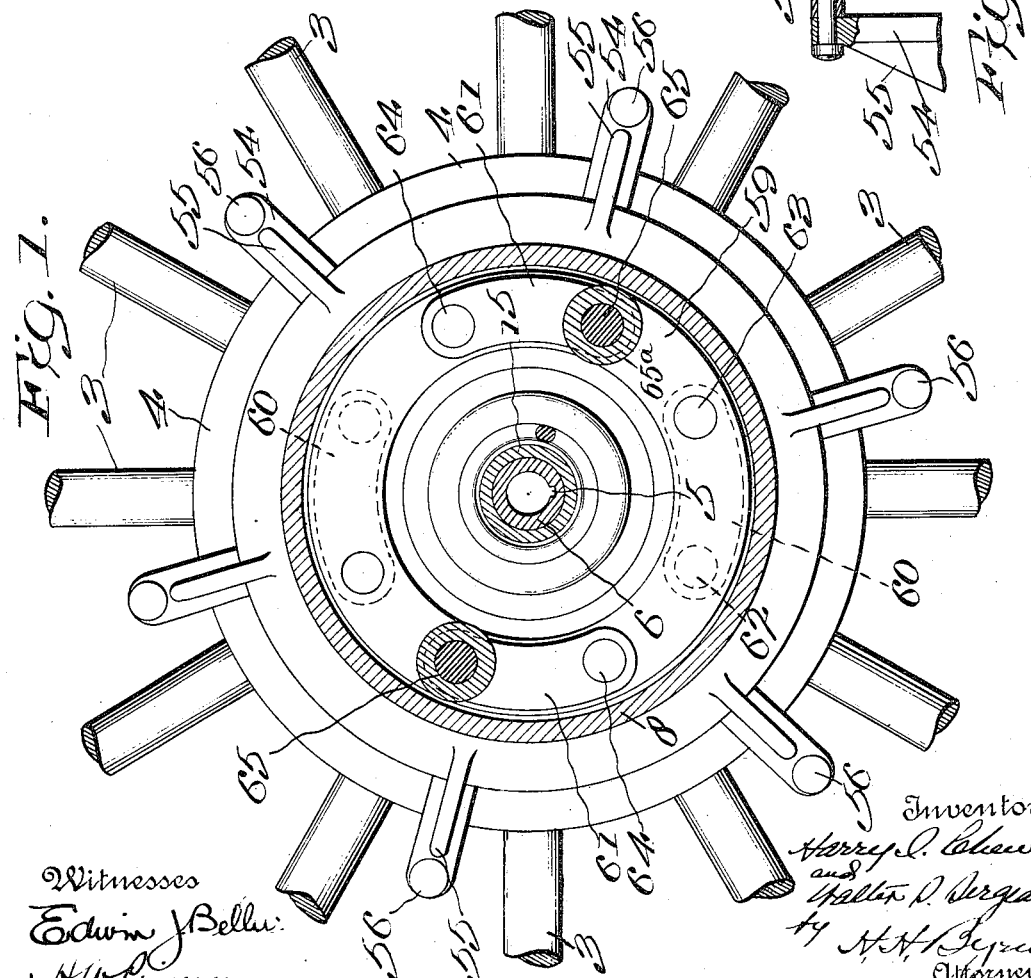

UNITED STATES PATENT OFFICE.

HARRY I. CHEW AND WALTER S. SERGEANT, OF WASHINGTON, DISTRICT OF COLUMBIA, ASSIGNORS, BY DIRECT AND MESNE ASSIGNMENTS, TO HUB SHOCK ABSORBER WHEEL COMPANY, OF LANCASTER, PENNSYLVANIA, A CORPORATION OF PENNSYLVANIA.

RESILIENT WHEEL.

1,169,924.      Specification of Letters Patent.      Patented Feb. 1, 1916.

Original application filed June 29, 1914, Serial No. 848,018. Divided and this application filed August 4, 1914. Serial No. 854,988.

*To all whom it may concern:*

Be it known that we, HARRY I. CHEW and WALTER S. SERGEANT, citizens of the United States of America, residing at Washington, in the District of Columbia, have invented certain new and useful Improvements in Resilient Wheels, of which the following is a specification.

The present invention relates to resilient wheels and forms a division of our co-pending application for improvements on resilient wheels filed June 29, 1914, and bearing Serial Number 848,018, patented Aug. 10, 1915, No. 1,149,425.

The invention has for its purpose to provide a wheel having means associated with the hub thereof which serves both as the resilient medium and shock absorber for the vehicle, and wherein all motion incident thereto is transmitted axially of the wheel, to the end of obtaining substantially complete flexibility with maximum rigidity of wheel structure.

The invention has for its further purpose to provide a novel form of driving connection between the wheel hub and wheel proper to the end that there will be perfect resiliency between these parts; and wherein the connecting medium is of simple and durable construction, and which will in no manner interfere with the normal resilient function of the wheel.

Another object of the invention is to construct a novel form of wheel hub chamber containing the resilient mounting for the wheel and wherein the hub elements are themselves rigidly secured together wholly outside of said chamber.

The invention is shown by way of illustration in the accompanying drawings wherein:

Figure 1 is a side elevational view thereof, and with parts in section for clearness. Fig. 2 is a central sectional view of the same, and Fig. 3 is a detail view of one of the hub connections.

Referring to the construction in further detail and wherein like characters of reference indicate corresponding parts in the different views shown 3 represents the spokes of the wheel and which at the center unite in the form of a disk 4, and which disk together with said spokes will hereinafter be referred to as the "rim" of the wheel.

The wheel hub comprises two members, or parts 5 and 6 which are mounted on the axle (not shown), and are constructed with side plates 8 and 9 respectively. Said plates 8 and 9 are formed with inturned edges disposed to have free contact or engagement with the opposite faces of the rigid rim portion 4, as clearly shown in Fig. 2. Said hub plates 8 and 9 are substantially of concavo-convex design in cross-section and form a substantially complete inclosure or housing for the wheel resilient elements contained therein.

A pair of sleeves 15 and 16 are mounted to have axial movement on the hub sections 5 and 6 within the housing and said sleeves are formed with cone heads 17 and 18 respectively. The conical surfaces of said cone heads bear in contact with the relatively angular faces formed on the rim 4, and a pair of springs 21 surrounding said sleeves hold said cone heads in resilient contact with the rim and form a floating suspension or bearing therefor after the manner described in our co-pending application heretofore referred to.

The hub sections 8 and 9 are rigidly united by a plurality of pairs of radially disposed lugs 54, having ribs 55, connected by bolts 56, provided with securing nuts 57. A spacing member or collar 58 is fitted on each of said bolts between each pair of lugs.

The connection between the rim and hub consists of a floating ring 59 arranged concentric with the axis of the hub and secured to said rim by a pair of diametrically opposite links 60 having pivotal engagement with the ring and rim by pintles 62 and 63; and a similar pair of links 61 connect said rim with the hub plate 8. The links 61 have pintle engagement at 64 and 65 with said ring and hub plate as in the former instance. The pintle 65 of the arm 61 has pivotal connection with the hub plate 8 by a boss 65ᵃ on said hub plate. (See Fig. 2). Said links 60 and 61 are curved concentric with the floating ring 59 and are located immediately adjacent said ring for their respective lengths, thus bringing the several pivotal centers of the links equidistant from the axis of the wheel and thereby the driving element forms a compact unit of restricted dimensions. The bearing portions of the side plates against the rim portion of the wheel are at points appreciably remote from the axis of the wheel, and the points of radial suspension (i. e. the contacting surfaces between the cone heads and the wheel rim portion 4) and the lateral sustaining means (the rim bearing portions of the side plates) are located in substantially the same central plane of the wheel, and it is this disposition of the parts that contributes in a great measure to the practical operation of the device.

From the foregoing it will be seen that the connection between the hub plates is located entirely with-out the hub chamber; and the connection between the rim and hub is sufficiently flexible for allowing freedom of movement of the rim with respect to the cushioning or sustaining element and yet sufficiently rigid to afford a positive driving connection between said rim and the hub.

It will be obvious of course that different forms of construction may be provided in lieu of that disclosed and described herein. And while we have shown and described certain apparatus for accomplishing the result initially stated it is to be understood that we are not limited to the precise details shown but may on the other hand adopt such modifications or changes within the scope of the claims to better suit the end in view.

Having thus described our invention what we claim as new and desire to protect by United States Letters Patent is:

1. In a resilient wheel, the combination of a hub having rigidly connected side plates; resilient members associated with the hub; a wheel rim portion in the plane of the wheel tread, radially sustained by said resilient elements and laterally sustained by the side plates; and a flexible driving connection located between one of said side plates and said wheel rim portion; said driving connection comprising a floating ring and two pairs of diametrically opposed links curved concentric with the ring and connecting said ring with said rim and the side plate, substantially as described.

2. In a resilient wheel, the combination of a hub member; a rim member radially movable relatively to said hub member; one of said members having a lateral extension bearing against the other of said members and thereby sustaining the rim member laterally by the hub member at points appreciably remote from the axis of the wheel; a resilient means sustaining the rim member radially, said radial sustaining means and the lateral sustaining means being located in substantially the same central plane of the wheel located between the hub member and the rim member; and a floating drive connection also located between said hub member and rim member and connected to both of said members.

In testimony whereof we affix our signatures in presence of two witnesses.

HARRY I. CHEW.
WALTER S. SERGEANT.

Witnesses:
H. F. RUETH,
G. AYRES.